United States Patent
Delfs

[15] 3,672,572
[45] June 27, 1972

[54] ROUGH GROUND SELF-PROPELLED SPRINKLING IRRIGATION APPARATUS

[72] Inventor: Larry M. Delfs, Omaha, Nebr.
[73] Assignee: Valmont Industries, Inc., Valley, Nebr.
[22] Filed: July 27, 1970
[21] Appl. No.: 58,424

[52] U.S. Cl. .............................................. 239/212, 137/344
[51] Int. Cl. ............................................................ A01g 25/02
[58] Field of Search .......................... 239/184, 188, 212, 213;
                                                137/344; 285/114; 248/58, 59, 61

[56] References Cited

UNITED STATES PATENTS

| | | | |
|---|---|---|---|
| 3,558,258 | 1/1971 | Johnson, Jr. | 239/212 X |
| 3,558,257 | 1/1971 | Harris | 239/212 X |
| 2,889,993 | 6/1959 | Willetts et al. | 137/344 X |
| 3,084,957 | 4/1963 | Caldwell | 285/114 |
| 3,242,499 | 3/1966 | Fonda-Bonardi | 285/114 X |

Primary Examiner—M. Henson Wood, Jr.
Assistant Examiner—Thomas C. Culp, Jr.
Attorney—Henderson & Strom

[57] ABSTRACT

A self-propelled water sprinkling apparatus for irrigating a relatively large section of land wherein an elongated main water distributing pipe is revolved about one end as a pivot by a plurality of self-propelled support stations automatically maintained in alignment, with the apparatus capable of traveling over unduly irregular terrain or rough ground without inducing excessive stresses in the distributing pipe, the pivot or at the support towers by the introduction of flex joints in the distributing pipe at particular locations, and of a unique cable suspension arrangement for supporting the distributing pipe.

10 Claims, 26 Drawing Figures

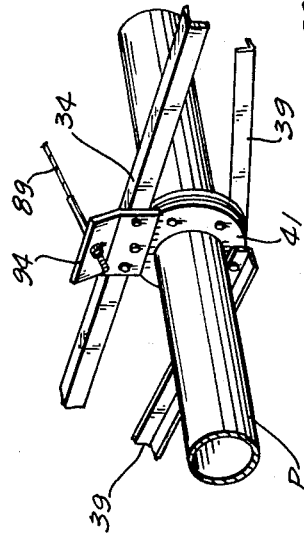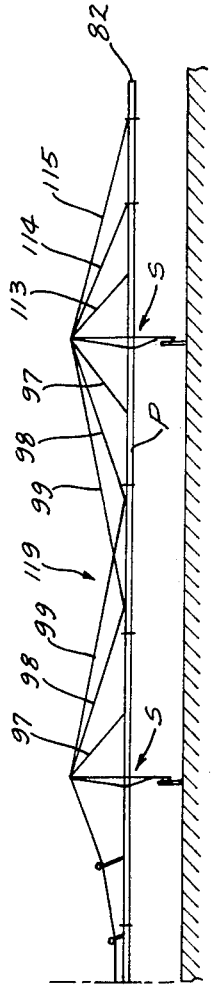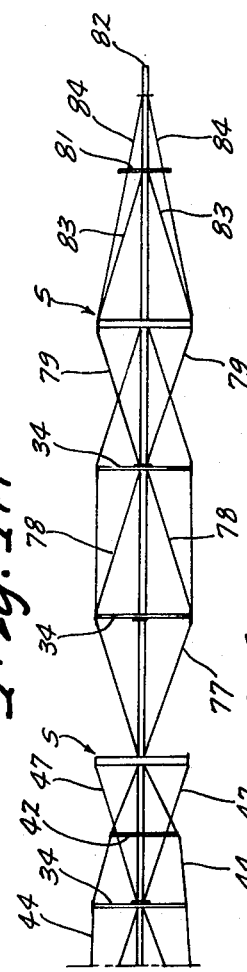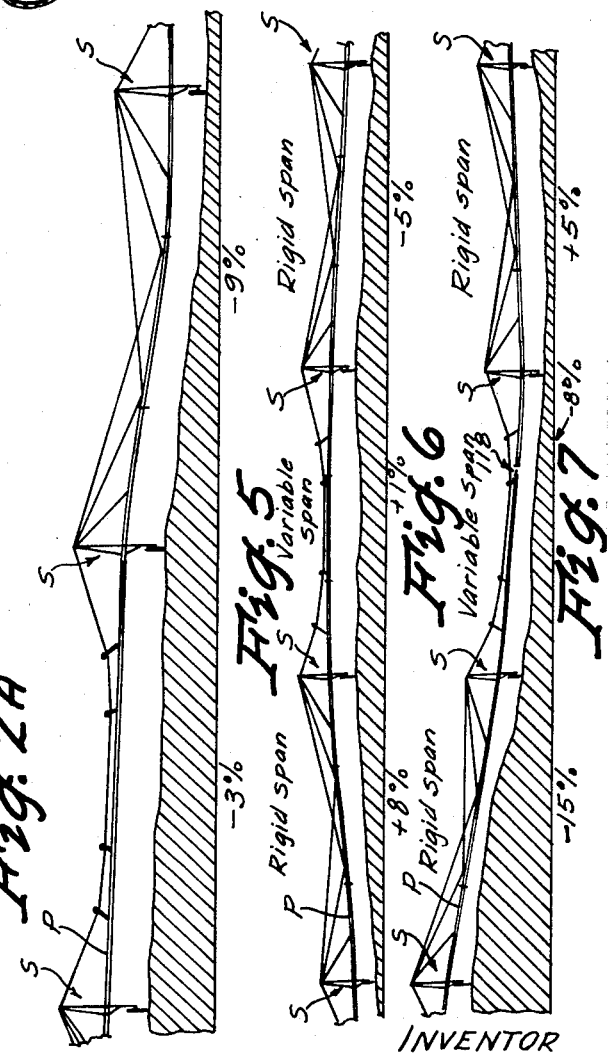

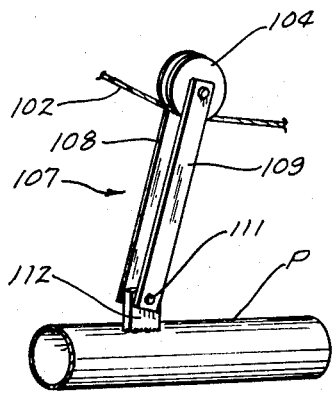
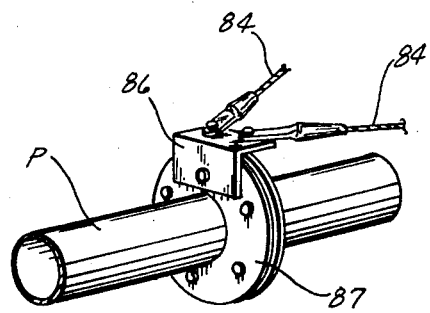
Fig. 11
Fig. 12
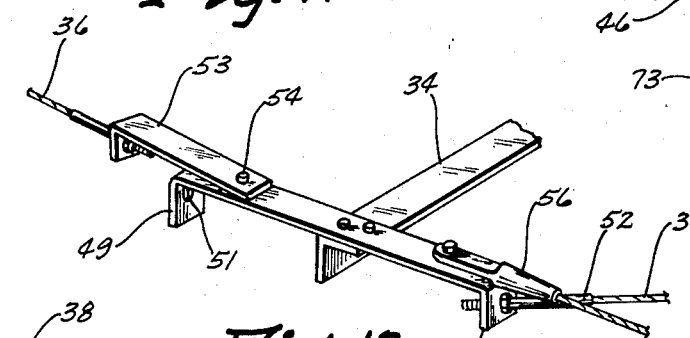
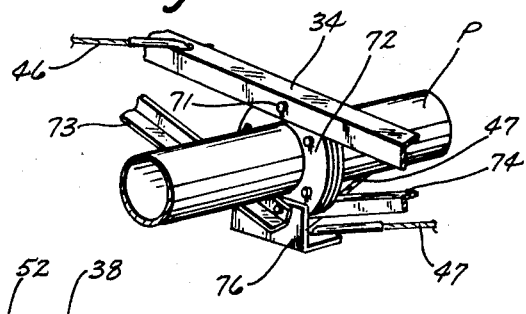
Fig. 13
Fig. 14
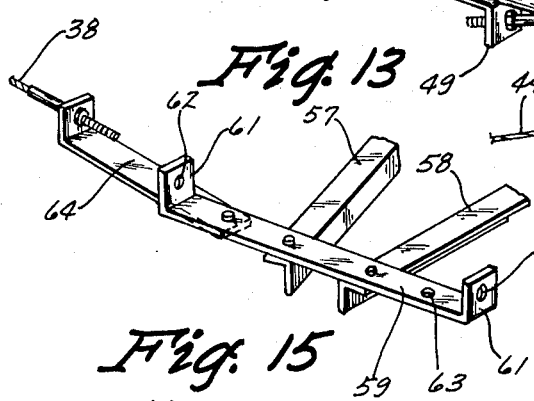
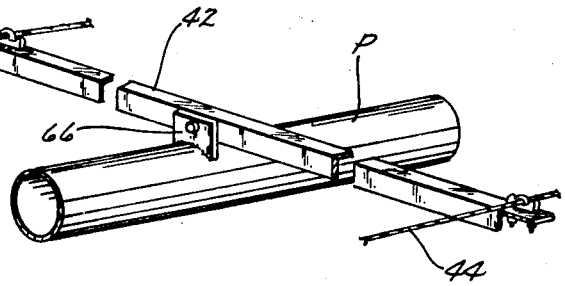
Fig. 15
Fig. 16
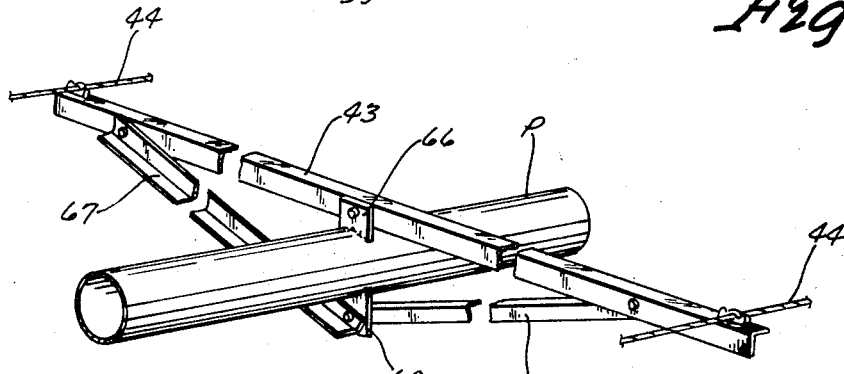
Fig. 17

INVENTOR
LARRY M. DELFS
BY
Henderson & Strom
ATTORNEYS

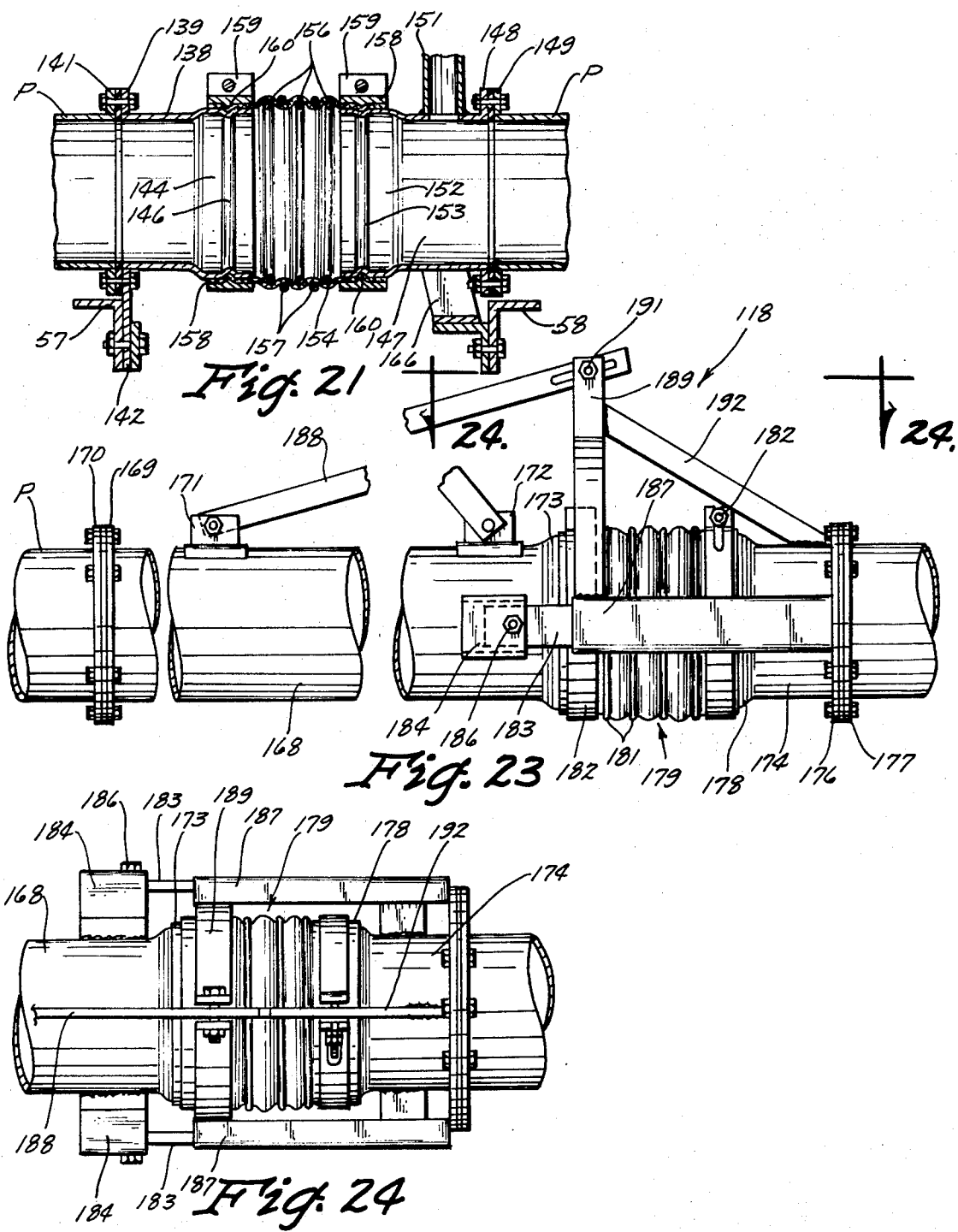

ROUGH GROUND SELF-PROPELLED SPRINKLING IRRIGATION APPARATUS

BACKGROUND OF THE INVENTION

Self-propelled sprinkling irrigating systems of the center pivot type have heretofore been limited to utilization on relatively smooth ground due to the inherent nature of their structure. The use of relatively inflexible steel pipe sections of 6 inch diameter, and in lengths of up to 32 feet, joined at their flanges so as to form a continuous solid pipe of a quarter mile in length, for example, has prohibited sufficient flexibility of the entire system to enable it to move over terrain where the grade variance is more than 5°, for example.

Furthermore, and particularly where the system employs towers at the stations from which cables are suspended for supporting the distributing pipe, the conventional manner of employing stationary cable pipe connecting joints is a definite limitation on the capability of the system to move over rough terrain without pulling the cables out of their sockets, breaking cable flange welds, buckling the pipe, or even collapsing a tower. Contemporary tower-type pipe suspension systems, other than having springs associated with the cables which help but not enough, have no means for maintaining the stresses on the tower cable even and constant regardless, substantially, of the irregularity of the terrain.

SUMMARY OF THE INVENTION

This invention relates to a self-propelled sprinkling irrigating apparatus having a central water supply pivot pipe, a distributing pipe pivotally connected to said pivot pipe and movable around said pivot pipe as an axis, a plurality of supports or towers disposed at spaced positions along said distributing pipe, a plurality of discharge nozzles spaced along said distributing pipe for spraying water onto the land as said distributing pipe moves around, drive means at each support, and means for maintaining the supports in alignment as the apparatus operates, the improvement being particularly related to a means for supporting a section of the distributing pipe between a pair of adjacent towers, arranged in alternating sequence with more conventional means for supporting the next adjacent section of distributing pipe between the next adjacent towers, the novel means amounting to movable points for supporting the pipe extended along a cable stretched between two towers which points move in response to movement of the system over the terrain so as to maintain a constant stress on the cable thus not inducing a damaging load at any particular point because of the rough terrain.

In conjunction with the improved distributing pipe suspension system, the distributing pipe itself is made more flexible by the interposing of flex joints at either the pivot, intermediate the towers, or at the towers themselves.

It is an object of this invention to provide an improved self-propelled sprinkling irrigation system adapted for rough ground use.

It is another object of this invention to provide a new suspension system such that even stress upon the pipe suspension apparatus and upon the pipe itself is obtained regardless of the terrain, within of course the limitation of the system being used on land where irrigation would be reasonable.

Still another object of this invention is to provide a new suspension system such that flexibility of the distributing pipe may be achieved where necessary as determined by the terrain over which the system operates, and is variable if the system is moved to new terrain.

These objects and other features and advantages of this invention will become more readily apparent upon reference to the following description when taken in conjunction with the accompanying drawings.

BRIEF DESCRIPTION OF THE DRAWINGS

FIGS. 1 and 1A combine to form a reduced side elevational view of a self-propelled sprinkling irrigation system embodying certain features of this invention;

FIGS. 2 and 2A combine to form a plan view of the system of FIGS. 1 and 1A;

FIGS. 3 through 7 inclusive are chematic views in side elevation, each a portion of the system of FIGS. 1 and 1A, depicting five different examples of terrain conditions over which the present system is operable;

FIGS. 8 through 17 inclusive are fragmentary, enlarged, perspective views of structural details of the system of this invention;

FIG. 21 is a sectional view taken along the line 21—21 of FIG. 20;

FIG. 23 is a foreshortened, fragmentary side elevational view of a pipe flex joint of this invention, with certain portions broken away and others shown in dotted lines for clarity of illustration; and FIG. 24 is a fragmentary plan view of the structure of FIG. 23.

DESCRIPTION OF THE PREFERRED EMBODIMENT

Figure 1:
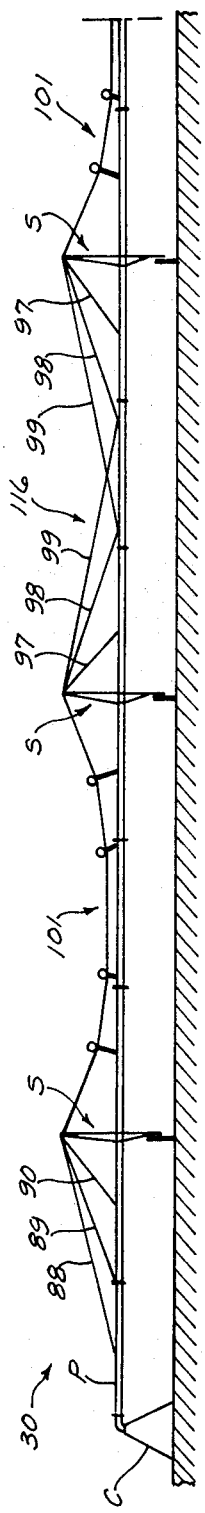
Figure 2:
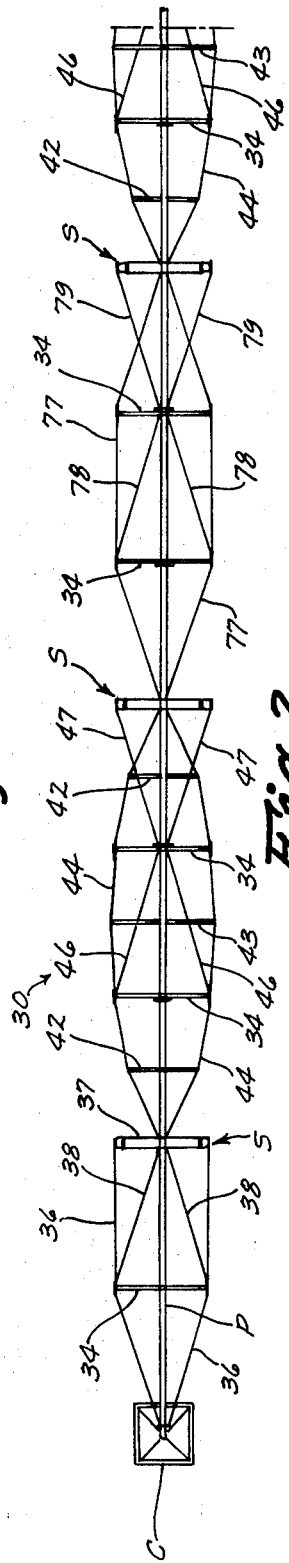

Referring particularly to FIGS. 1 and 2, an embodiment designated generally 30 of a self-propelled sprinkling irrigating apparatus is disclosed, this being of the type shown in U. S. Pat. No. 3,001,721 issued Sept. 26, 1961 to F. L. Zybach, portions of which are incorporated herein as described hereinafter.

A relatively long distributing pipe P may be mounted on a series of towers or supports S for rotation about a central structure C, located at approximately the center of a field to irrigate by sprinkling the land enclosed within a circle. The water may conveyed from a pump (not shown) to the structure C through a pipe (not shown) preferably buried in the field so the supports S may move thereover during rotation around the field.

As set forth in the '721 patent, column 4, the distributing pipe P may be provided with spaced, conveniently conventional, sprinkling nozzles, preferably of the swinging type which automatically reciprocate through an arch of a sufficient number of degrees that the entire area behind the pipe, for instance, will be covered. Since outer portions of the pipe P will travel at a faster rate than inner portions, the sprinkling nozzles are preferably graduated in size so that a successively greater amount of water will be discharged through the sprinkling nozzles from the inner to the outer end of the pipe P. It will be understood, of course, that the pipe P may be run along the field, rather than around in the field, in which event the sprinkling nozzles may be of approximately the same size. The capacity of the well or other source of water need not be relatively great, since the apparatus may be set to rotate around the field once every 10 to 24 hours and a flow of 200 to 500 gallons a minute is normally sufficient.

Figure 18:
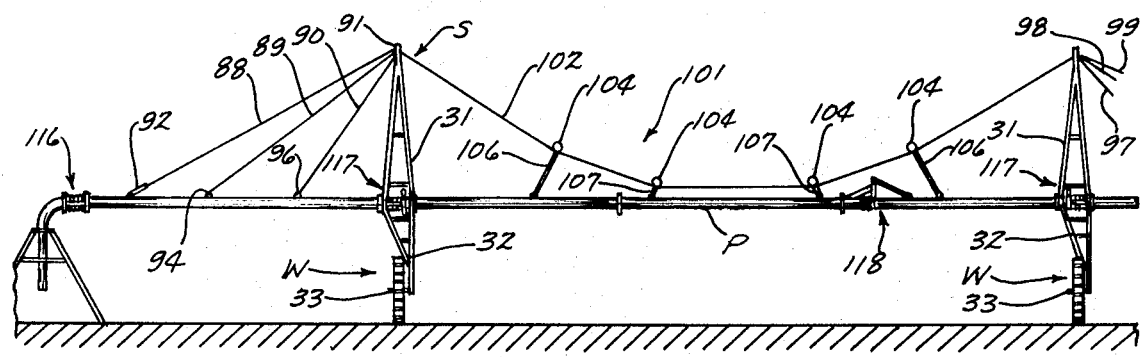
FIG. 18 is an enlarged side elevational view of the center pivot end of a system of this invention, showing the use of certain flex joints for the distributing pipe.
Figure 19:
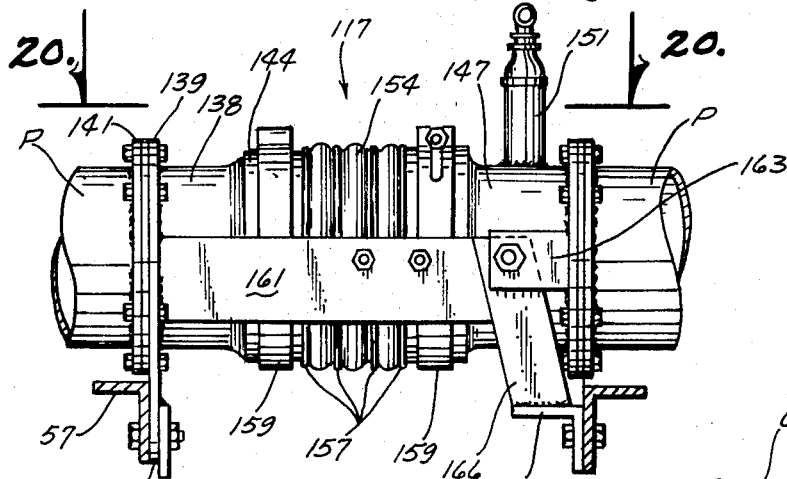
FIG. 19 is a further enlarged, fragmentary view of a tower flex joint.

Each support S, as seen best in FIG. 18, may include a tower having an upper section 31 formed from angles or other suitable structural members, diverging from the top downwardly to a lower section 32, the upper section 31 appearing as triangular when viewed from either the end, as in FIG. 18, or from the side, and the lower section 32 appearing inverted triangular when viewed from the end as in FIG. 18, and trapezoidal when viewed from the side. A pair of drive wheels W, only one being shown, are mounted at each side of each support S on an axle 33 extended in an off set manner from the end of a beam (not shown) extended transverse to the pipe P, with the wheels W being equidistantly spaced on either side of the pipe P at the ends of the beam, the latter forming the base of the tower.

The central structure C is substantially identical to that described in the '721 patent, column 5, lines 29 – 51 inclusive.

Means for driving the supports S and for controlling their alignment in operation are provided, being substantially identical to that described and illustrated in the '721 patent in column 5, lines 52 to the end, columns 6 – 12 inclusive, and column 13, lines 1 – 21 inclusive.

As best seen in FIG. 2, the pipe P may be reinforced by horizontal wires and bracing, and provided with such a cable arm 34 (See FIG. 8) spaced equidistantly between the central structure C and the innermost support S. A pair of outer wires 36 may extend from the structure C to the outer ends of the tower upper beam 37 via the outer ends of the arm 34, and a pair of inner wires 38 may extend from the outer ends of the arm 34 to the center of the beam 37. The arm 34 (FIG. 8) is supported by a pair of braces 39 interconnected between the pipe flange 41 and the arm 34 at their outer ends.

Between the next support S, (FIG. 2) and the innermost support S, a like pair of end cross braces 42 (See also FIG. 16) are provided, then a pair of intermediate arms 34, and a center arm 43 (See also FIG. 17). The elements 42, 34 and 43 are equidistantly spaced between the supports S. A pair of outer wires 44 extend on each side of the pipe P from the innermost support S to the outer ends of the brace 42, the arm 34, the center arm 43, the arm 34, the brace 42 and back to the pipe P at the next support S. A pair of inner wires 46 extend each from the outer ends of one arm 34, as illustrated in FIG. 2, inwardly to the center of the opposite arm 34, and another pair of horizontal bracing wires 47 extend from the center of the latter arm 34 outwardly to the outer ends of the second support S.

Each outer end of a cable arm 34 (FIG. 13) includes a double cable support bar 48 having a pair of ears 49 each with an opening 51 formed therein for receiving the end of a cable fitting such as 52 for wire 38, for example. As shown in FIG. 13, wire 36 is affixed to the bar 48 by a swivel 53, pivoted at 54 to the bar 48, and the continuation of wire 36 is connected by another type of swivel end 56.

Each outer end of a support S includes a pair of converging angles 57 and 58 (FIG. 15) connected by a bar 59 again provided with ears 61, and pairs of openings 62 and 63 therein, as for a swivel 64 for a horizontal bracing wire, 38 for example. The short cross braces 42 (FIG. 16) are affixed to the pipe P as by a lug 66; as with the center arm 43 (FIG. 17), also supported by a pair of braces 67 and 68 interconnected between the outer ends of the arm 43 and a bottom lug 69.

Referring to FIG. 14, the center of an arm 34, for example, is shown. The arm 34 has a wire 46 connected thereto, near its center connection 71 with a pipe flange 72, and another wire 46, not shown in FIG. 14, may also be connected thereto. At the bottom of the flange 72, a pair of braces 73 and 74 connect thereto, as is a cable attachment ear 76 provided for a pair of cables, 47 for example.

Referring back to FIGS. 2 and 2A, the next span of horizontal trussing between the second tower S and the third tower S outwardly from the pivot structure C comprises a pair of arms 34, a pair of outer wires 77 connected as illustrated, a pair of inner wires 78, and another pair of inner wires 79 all connected as illustrated. The horizontal trussing and bracing between the third and fourth supports S is identical to that between the first and second supports S, and that between the fourth and fifth supports S is identical to that between the second and third supports S.

Beyond the fifth support S (FIG. 2A), a short brace 81 is provided intermediate the support and the end 82 of the pipe P at a flange, and a pair of wires 83 extend from the outer ends of the support beam 37 to the center of the brace 81, with another pair of wires 84 extended between the beam outer ends to an ear 86 on a pipe flange 87 (FIG. 12).

Referring to FIGS. 1 and 18, it is seen that the top of each tower of a support S may be connected to the pipe P by slanting cables. Although the pipe P is preferably comparatively thin walled and also light in weight, and has sufficient flexibility to accommodate movement of the supports S as they pass over uneven terrain, the pipe P does not have sufficient strength to hold up a support by itself. The first tower has a trio of cables 88, 89 and 90 (FIG. 10) interconnected between the top 91 and a bracket 92 (FIG. 9) pivotally connected to a pipe lug 93, as ear 94 (FIG. 8), and another lug 96, respectively.

Between the second and third, and fourth and fifth towers for supports S, a like pair of vertical cable trussing arrangements is provided, and only one will be described. A trio of support cables 97, 98 and 99 of differing lengths extend from the top of the second tower outwardly, relative to the center C, to equidistantly spaced lugs (not shown) welded to the pipe P, and an exact set of cables extend from the top of the third tower inwardly, again relative to the center C, to the same lugs as illustrated in FIGS. 1 and 1A.

Arranged between the first and second towers, and between the third and fourth towers (FIGS. 1 and 1A), so as to be alternately arranged with the cable support between the second and third, and fourth and fifth towers, just described, is another means 101 of supporting the pipe P. This comprises a single cable 102 secured at each end by a bracket 103 (FIG. 10) to the top 91 of each of the second and third towers, for example. The cable 102 is trained through the pulley 104 (FIG. 11) of each of four strap assemblies 106 and 107 pivotally secured to the pipe P at equidistantly spaced locations thereon (FIGS. 18).

The inner two strap assemblies 107 are identical and each comprises a pair of straps 108 and 109 (FIG. 11) arranged in parallel, spaced relation such that the cable 102 is trained therebetween, and pivotally connected by a pin 111 to an ear 112 welded to the P. The outer two strap assemblies 106 are also identical to each other, and to the strap assemblies 107 with the exception the straps of the 107 assemblies are shorter than those of the 106 assemblies assemblies as best illustrated in FIG. 18.

The vertical support arrangement for the pipe P is completed by a trio of cables 113, 114 and 115 (FIG. 1A) suspended from the top of the tower of the last support S to equidistantly spaced connections on the pipe P.

Figure 22:
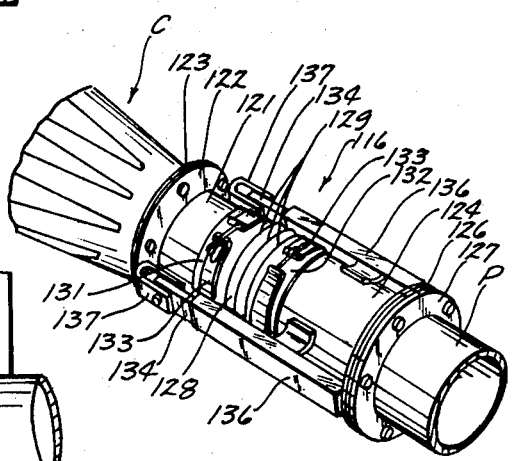
FIG. 22 is a perspective, fragmentary view of a center pivot flex joint of this invention.
Figure 20:
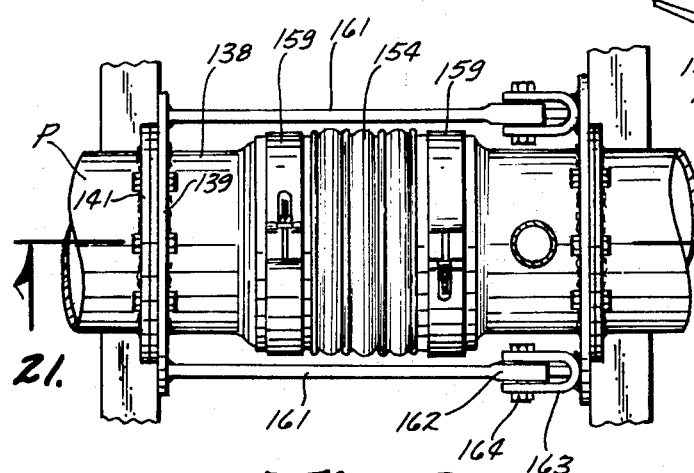
FIG. 20 is a plan view of FIG. 19.

To enable the system 30 to irrigate grades up to 22 percent, thereby having a real rough ground capability, the system 30 is provided with three flex assemblies, a center pivot assembly 116 (FIGS. 18 and 22), a tower flex assembly 117 (FIGS. 18 and 19–21), and a pipe flex assembly 118 (FIGS. 18 and 23, 24). The assemblies are used in various combinations with each other as seen hereinafter, and also with the cable support 101, called hereinafter a variable span support 101, with the alternate support arrangement called hereinafter a rigid span support 119.

The center pivot assembly 116 (FIG. 22) includes an outer pivot flex pipe section 121 with a flange 122 for mating with the flange 123 of the central structure C, another pipe section 124 also having a flange 126 for mating with the flange 127 of the main distributing pipe P, and includes further a flexible joint 128 including a plurality of inner (not shown) and outer rings 129 horizontally and alternately spaced. The outer ends 131 and 132 of the joint 128 are secured to the sections 121 and 124, respectively, by a pair of conventional clamps 133, and sections 121 and 124 are pivotally interconnected for relative movement in a vertical plane by a pair of pivot arms 134 each reciprocally mounted in a housing 136 secured to one section 124, and pivotally connected to a U-bracket 37 secured to the other sections 121. The pivot flex assembly 116 is used when the terrain goes up or down from the center pivot structure C.

A tower flex assembly 117 (FIGS. 19 – 21) comprises a pipe section 138 having a flange 139 for connection to the flange 141 of the distributing pipe P. The flange 139 has a bottom portion 142 which is secured to an angle 57, for example, of the support S. The inner end 144 of the section 138 has an indentation 146 formed therein for a purpose described hereinafter.

The flex assembly 117 includes another pipe section 147 also with a flange 148 for mating with the flange 149 of the pipe P. The section 147 is provided with a water reducer connection for communicating the water within the pipe P with the drive means for the support as described in the hereinbefore designated portions of the '721 patent. The inner end 152 of the section 147 also has an indentation 153 formed therein. The flex assembly 117 is completed by a flexible joint 154 which includes a plurality of inner rings 156 (FIG. 21) and outer rings 157 arranged in a parallel, equally spaced, inner and outer formation as best illustrated in FIG. 21.

The ends 158 of the flexible joint 154 are placed over the indentations 146 and 153, such that clamps 159 for clamping the ends 158 of the joint 154 to the respective pipe sections 138 and 147 are enabled to mate an annular protrusion 159 formed thereon with the respective indentations as best illustrated in FIG. 21.

The pipe sections 138 and 147 are pivotally connected by a pair of pivot arms 161 each secured in parallel relationship on opposite sides of the joint 154, one end being secured to the flange 139 with the other end being pivotally connected to a U-bracket 163, as by a pivot 164. The bracket 163 is braced by a support 166 secured to a shelf 167 secured in turn to the other angle 58. The pipe flex assembly 118 (FIGS. 23 and 24) comprises a long pipe section 168 having a flange 169 at its outer end for mating engagement with the flange 171 of the distributing pipe P. A pair of lugs 171 and 172 are secured to the top of the section 168, the latter being useable for a cable connection, for example. The inner end 173 of the pipe section 168 is supported in spaced relation from a shorter pipe section 174.

The section 174 has an outer flange 176 for mating engagement with the flange 177 of the pipe P, and is also provided with an inner end 178. The ends 173 and 178 are flexibly joined by a flexible joint 179 with inner rings (not shown) and outer rings 181 of an arrangement identical to that described with respect to the tower flexible joint 117 (FIG. 21). The flexible joint 179 is held in place by a pair of clamps 182 securing the outer ends of the joint 179 to the inner ends 173 and 178, respectively, of the pipe sections 168 and 174.

The two sections 168 and 174 are pivotally connected by a pair of parallel pivot arms 183 placed on opposite sides of the flexible joint 179, with one end of each pivot arm 183 pivotally connected to a pivot unit 184 secured to the long pipe section 168 intermediate its ends. The other ends of the pivot arms 183 are mounted in housing units 187 which are in turn secured to opposite sides of the shorter pipe section 174 as best illustrated in FIG. 24.

Figure 3:

The amount of pivotal movement of the respective sections 168 and 174 is limited by a limit arrangement comprising an elongated bar 188 one assemblies 117 are necessary. In FIG. 3, no tower pivot assembly 117 which is pivotally connected to the lug 171 and the other end of which is pivotally connected as by fastener 191 to the upper end of a standard 189 secured at its lower ends to the long pipe section inner end 173 (FIG. 23). The standard 189 is supported by a brace 192 as best illustrated in FIG. 23.

Figure 4:
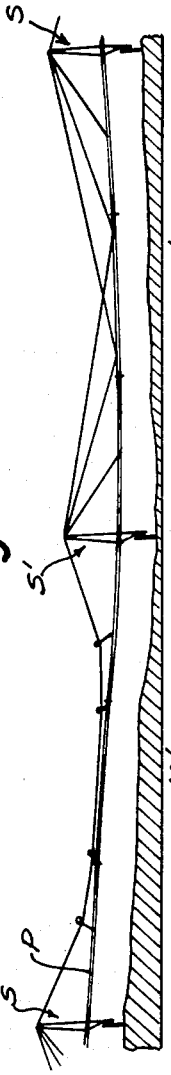

Referring now to FIGS. 3, 4 and 5, a trio of different terrain conditions are illustrated for the purpose of showing when tower flex assembly 117 is required because the slope variation which must be absorbed at the middle tower unit S' does not exceed 8 percent. In FIG. 4, a tower flex assembly 117 is required at the center support S' because the slope variation which must be absorbed thereat exceeds 8 percent.

In the FIG. 5 example, no tower flex assembly 117 is required as the slope between the two spans continues in the same direction, but with a varying degree. In this case, the difference must be ascertained, and if it is less than 8 percent, no tower flex assembly 117 is required.

To ascertain when a pipe flex assembly 118 is required, referring to FIGS. 6 and 7 again a calculation of the slope variation between rigid spans must be calculated In FIG. 6, no pipe flex assembly 118 is required in the variable span as the slope variation between the rigid spans on each side thereof does not exceed 18 percent. As an example, plus 8 percent and minus 5 percent equal a 13 percent slope variation. In the second example of FIG. 7, a pipe flex assembly 118 is required in the variable span as illustrated, as the slope variation between the rigid spans on each side of the variable span exceeds 18 percent. Thus, minus 15 percent and plus 5 percent equal 20 percent slope variation.

If the slope between the central structure C and the first support S is greater than 5 percent at any point in the rotation, a pivot flex assembly 116 (FIG. 18) should be installed. In summation, where the slope variation between spans on either side of a support is greater than 8 percent during the entire rotation of the system 30, a tower flex assembly 117 is required. The end support does not require a tower flex assembly 117. If the slope variance between the rigid spans on each side of a variable span is greater than 18 percent at any point in the rotation of the system 30, the variable span will require a pipe flex assembly 118 in the intermediate pipe section of the span.

Although not illustrated herein, under certain conditions, such as where a downhill slope exceeds 10 percent, it is recommended that a brake is provided on any drive unit of a support when the slope exceeds 10 percent. The brake would be a conventional arrangement applied to one of the drive wheels W of a carriage and arranged to prevent shutdown and possible damage to the system 30 as it moves down on steep grades.

I claim:

1. In a self-propelled sprinkling irrigating apparatus having a central water supply pivot pipe, a distributing pipe pivotally connected to said pivot pipe and movable around said pivot pipe as an axis, a plurality of supports disposed at spaced positions along said distributing pipe, a plurality of discharge nozzles spaced along said distributing pipe for spraying water onto the land as said distributing pipe moves around, drive means at each support, and means for maintaining the supports in alignment as the apparatus operates, the improvement comprising:

flexible means at the junction of the pivot pipe and the distributing pipe for permitting said distributing pipe to pivot in a vertical plane as said distributing pipe is moved around the pivot pipe.

2. In a self-propelled sprinkling irrigating apparatus as described in claim 1, and wherein second flexible means is interposed in said distributing pipe intermediate a pair of adjacent supports for permitting said distributing pipe to pivot in a vertical plane as said distributing pipe is moved around said pivot pipe.

3 In a self-propelled sprinkling irrigating apparatus as described in claim 2, and wherein third flexible means is interposed in said distributing pipe at each of said support means for permitting said distributing pipe to pivot in a vertical plane as said distributing pipe is moved around said pivot pipe.

4. In a self-propelled sprinkling irrigating apparatus having a central water supply pivot pipe, a distributing pipe pivotally connected to said pivot pipe and movable around said pivot pipe as an axis, a plurality of supports disposed at spaced positions along said distributing pipe, a plurality of discharge nozzles spaced along said distributing pipe for spraying water onto the land as said distributing pipe moves around, drive means at each support, and means for maintaining the supports in alignment as the apparatus operates, the improvement comprising:

flexible means interposed in said distributing pipe intermediate a pair of adjacent supports for permitting said distributing pipe to pivot in a vertical plane as said distributing pipe is moved around said pivot pipe.

5. In a self-propelled sprinkling irrigating apparatus having a central water supply pivot pipe, a distributing pipe pivotally connected to said pivot pipe and movable around said pivot pipe as an axis, a plurality of supports disposed at spaced positions along said distributing pipe, a plurality of discharge nozzles spaced along said distributing pipe for spraying water onto the land as said distributing pipe moves around, drive means at each support, and means for maintaining the supports in alignment as the apparatus operates, the improvement comprising:

means for supporting the distributing pipe between a pair of adjacent supports, wherein the upper portions of the supports extend above the pipe, including a cable secured at each end to the adjacent upper portions so as to extend above the pipe, and a plurality of spaced connector means each pivotally connected at one end to the pipe and movably connected at an opposite end to said cable, whereby the tension applied to the cable tends to be even regardless of the terrain over which the apparatus is moving.

6. In a self-propelled sprinkling irrigating apparatus as described in claim 5, and wherein each connector means comprises a standard having a sheave rotatably mounted thereon at said opposite end, with the cable trained beneath the sheave and retained thereon by said standard.

7. In a self-propelled sprinkling irrigating apparatus having a central water supply pivot pipe, a distributing pipe pivotally connected to said pivot pipe and movable around said pivot pipe as an axis, a plurality of supports disposed at spaced positions along said distributing pipe, a plurality of discharge nozzles spaced along said distributing pipe for spraying water onto the land as said distributing pipe moves around, drive means at each support, and means for maintaining the supports in alignment as the apparatus operates, the improvement comprising:

first means and second means for supporting the distributing pipe between alternate, adjacent pairs of supports from the pivot pipe outwardly to the end of the distributing pipe, said first means comprising a cable secured at each end to a support such that said cable is disposed above the distributing pipe and a plurality of connector means each pivotally connected at one end to the distributor pipe between the adjacent pairs of supports and movably connected at an opposite end to said cable;

said second means including a plurality of cables of different, predetermined lengths connected together at common ends to the upper part of one support and connected at their opposite ends in spaced relation to the portion of the distributing pipe between the alternate pair of adjacent supports, and including another plurality of cables of different, predetermined lengths connected together at common ends to the upper part of the other support and connected at their opposite ends in spaced relation to the said distributing pipe portion.

8. In a self-propelled sprinkling irrigating apparatus as described in claim 7, and wherein flexible means is inserted at the junction of the pivot pipe and the distributing pipe for permitting said distributing pipe to pivot in a vertical plane as said distributing pipe is moved around the pivot pipe.

9. In a self-propelled sprinkling irrigating apparatus as described in claim 8, and wherein second flexible means is interposed in said distributing pipe intermediate a pair of adjacent supports for permitting said distributing pipe to pivot in a vertical plane as said distributing pipe is moved around said pivot pipe.

10. In a self-propelled sprinkling irrigating apparatus as described in claim 9, and wherein third flexible means is interposed in said distributing pipe at each of said support means for permitting said distributing pipe to pivot in a vertical plane as said distributing pipe is moved around said pivot pipe.

* * * * *